United States Patent [19]

Bambara et al.

[11] Patent Number: 5,998,006
[45] Date of Patent: *Dec. 7, 1999

[54] VARIEGATED EXTRUDED ARTICLE AND METHOD OF MAKING

[75] Inventors: John D. Bambara, Osterville, Mass.; Michael Bambara, Herkimer; Richard Bambara, Cooperstown, both of N.Y.; Robert F. Hurley, Centerville; Matthew L. Kozma, Osterville, both of Mass.

[73] Assignee: Sentinal Products Corporation, Hyannis, Mass.

[ * ] Notice: This patent issued on a continued prosecution application filed under 37 CFR 1.53(d), and is subject to the twenty year patent term provisions of 35 U.S.C. 154(a)(2).

[21] Appl. No.: 08/708,115

[22] Filed: Sep. 3, 1996

[51] Int. Cl.$^6$ ........................................................ B32B 3/26
[52] U.S. Cl. ..................................... 428/304.4; 428/314.4; 428/542.8; 264/75; 264/171.1; 264/211
[58] Field of Search .......................... 264/211, 75, 171.1; 428/307.4, 314.4, 542.8

[56] References Cited

U.S. PATENT DOCUMENTS

| | | | |
|---|---|---|---|
| 3,067,147 | 12/1962 | Rubens et al. | 260/2.5 |
| 4,125,582 | 11/1978 | Langlois | 264/73 |
| 4,836,814 | 6/1989 | Bambara et al. | 441/65 |
| 5,272,236 | 12/1993 | Lai et al. | 526/348.5 |
| 5,589,519 | 12/1996 | Knaus | 521/60 |
| 5,626,892 | 5/1997 | Kehoe et al. | 426/3 |

*Primary Examiner*—Christopher Raimund
*Attorney, Agent, or Firm*—Fish & Richardson P.C.

[57] ABSTRACT

An extruded article having elongated variegations is described. The variegated extruded article has a plurality of elongated variegations that are substantially parallel to the direction of extrusion of the article. The number of elongated variegations in the article and the widths of the variegations can be adjusted by modifying processing conditions.

21 Claims, 3 Drawing Sheets

VARIEGATED EXTRUDED ARTICLE AND METHOD OF MAKING

BACKGROUND OF THE INVENTION

The invention relates to variegated extruded articles.

Extruded articles are available in an array of colors and styles for a variety of applications. When extruded articles are closed-cell foams, they are used in water sports equipment, such as surfboards, boogie boards, sail boards, toys, and other recreational items.

In certain applications, such as in the water sport industry, variegated articles are useful for aesthetic reasons. Historically, variegations on the surface of articles have been added on by a secondary extrusion process, a co-extrusion process, or coating process to introduce elongated variegations (i.e., stripes), for example, requiring additional processing steps and a means for adhering the article surface to the elongated variegation. The elongated variegations, or colored stripes, adhered to the surface can delaminate during use of the article or during exposure to weathering forces.

SUMMARY OF THE INVENTION

The invention provides a method of producing variegations on an article during extrusion. The variegated extruded article has a plurality of elongated variegations that are substantially parallel to the direction of extrusion of the article. The number of elongated variegations in the article and the widths of the variegations can be adjusted by modifying processing conditions.

In one aspect, the invention features a method of extruding a variegated article. The method includes the steps of: heating a composition to a melt temperature in an extruder; adding a liquid color to the heated composition to form a variegated mixture; and extruding the variegated mixture from a die to give a variegated article. The composition has a base color and the liquid color includes a second color that is different from the base color.

In preferred embodiments, the method further includes the step of passing the variegated mixture through a plurality of openings within the extruder. It is preferred that at least some of the extruder openings are openings in a breaker plate or, alternatively, a screen. Preferably, the liquid color is fluid at temperatures less than the melt temperature. In preferred embodiments, the method further includes the step of foaming the variegated article after extrusion to give a variegated foam article.

In another aspect, the invention features an extruded article including a uniform composition having a base color and a plurality of elongated variegations of a second color different from the base color, the elongated variegations being parallel to the direction of extrusion of the extruded article. Preferably, the variegated article is foamed.

In preferred embodiments, the composition includes a polyolefin resin. Preferably, the polyolefin resin is silane-grafted. In other preferred embodiments, the polyolefin resin is a single-site initiated polyolefin resin. Preferably, the composition includes a physical foaming agent.

As used herein, a melted composition is a composition that is heated to a temperature that is sufficient to permit good material flow and good mixing of the components in the extruder. The composition can be melted or partially melted provided sufficient flow can be achieved within the extruder.

A low-density polyethylene (LDPE) is a polymer of ethylene with a density between 0.915 and 0.930 g cm$^{-3}$.

Since LDPE is prepared under, for example, free-radical conditions and high pressures, it is highly branched. The term "highly branched," as used herein, means that the polymers have approximately one to two short chain branches for every one hundred carbon atoms in the polymer backbone. Methods of quantifying branching are distinguishable by $^{13}$C NMR spectroscopy. See, for example, Randall, *Rev. Macromol. Chem. Phys.*, C29 (2 & 3), p. 285–297, incorporated herein by reference.

A single-site initiated polyolefin resin is a polyolefin prepared from a single-site initiator polyolefin that has controlled molecular weights and molecular weight distributions. The polyolefin can be polyethylene or a copolymer of ethylene and alpha-unsaturated olefin monomers. One class of a single-site initiators of particular interest are the metallocene initiators which are described, for example, in J. M. Canich, U.S. Pat. No. 5,026,798, in J. Ewen, et al., U.S. Pat. No. 4,937,299, in J. Stevens, et al., U.S. Pat. No. 5,064,802, and in J. Stevens, et al., U.S. Pat. No. 5,132,380, each of which are incorporated herein by reference. These initiators, particularly those based on group 4 transition metals, such as zirconium, titanium and hafnium, are extremely high activity ethylene polymerization initiators.

The single-site initiators are versatile. The polymerization conditions such as a initiator composition and reactor conditions can be modified to provide polyolefins with controlled molecular weights (e.g., in a range from 200 g mol$^{-1}$ to about 1 million or higher g mol$^{-1}$) and controlled molecular weight distributions (e.g., $M_w/M_n$ in a range from nearly 1 to greater than 8, where $M_w$ is the weight average molecular weight and $M_n$ is the number average molecular weight). Molecular weights and molecular weight distributions of polymers can be determined, for example, by gel permeation chromatography.

The polyolefins provided by these initiators are essentially linear, meaning that the polymers can contain uniformly distributed, highly controlled short chain branching sites. The essentially linear polymers are polymers that have less than about one long-chain branch for every ten thousand carbon atoms in the backbone of the polymer. One method of determining branching is $^{13}$C NMR spectroscopy.

The polymers can be copolymers. A copolymer is a polymer resulting from the polymerization of two or more monomeric species, including terpolymers (e.g., resulting from the polymerization of three monomeric species), sesquipolymers, and greater combinations of monomeric species. Copolymers are generally polymers of ethylene with $C_3$–$C_{20}$ alpha-olefins.

When the single-site initiated polyolefins are copolymers, the composition distribution breadth index (CDBI) is generally greater than 50% and most preferably above 70%. The CDBI is a measurement of the uniformity of distribution of comonomers among the individual polymer chains having a commoner content within 50% of the median bulk molar commoner content.

The melt index (MI) of a polymer resin is a measurement of processability under low shear rate conditions. The MI can be determined by ASTM D-1238 Condition E (190° C./2.16 kg). The MI of the polyolefins is generally between about 0.2 dg/min and about 100 dg/min, preferably, between about 1 dg/min and about 10 dg/min, and most preferably between about 2 dg/min and about 8 dg/min. The melt index of the polymer resins can be measured using ASTM D-1238.

Silane-grafting entails attaching one or more silicon-containing monomer or polymer to the original polymer chains. The grafting is generally accomplished by forming active grafting sites on the original polymer chains in the presence of silicon-containing monomers, which can further polymerize as branches from the original polymer chains. Active grafting sites can be generated, for example, by free radicals or anions.

The invention can have one or more of the following advantages. Additional extrusion steps or operations (i.e., additional extrusion equipment) are not needed to form the extruded article with elongated variegations, since the variegations are introduced during extrusion of the melted composition. Furthermore, since the variegations are part of one piece of material (i.e., the article is not laminated), compatibility of different materials in the different colored regions is not a concern. In addition, the variegations are formed immediately upon extrusion. By modifying the liquid color pigment, it is possible to vary colors in the article.

Moreover, the number of variegations, width of elongated variegations and number of colors can easily and readily be altered by changing the extrusion conditions, i.e., ports to inject colors and changing the pattern or openings in the breaker plates and screens. It is also possible to add more than one liquid color to make multicolored stripes in the article.

The process of introducing elongated variegations can be used in any type of extrusion operation and can be extruded through annular, flat, or profile dies. The extruded composition can be cross-linked, non-cross-linked, foamed, or non-foamed.

Other features and advantages of the invention will be apparent from the following detailed description thereof, and from the claims.

DETAILED DESCRIPTION

Figure 1:
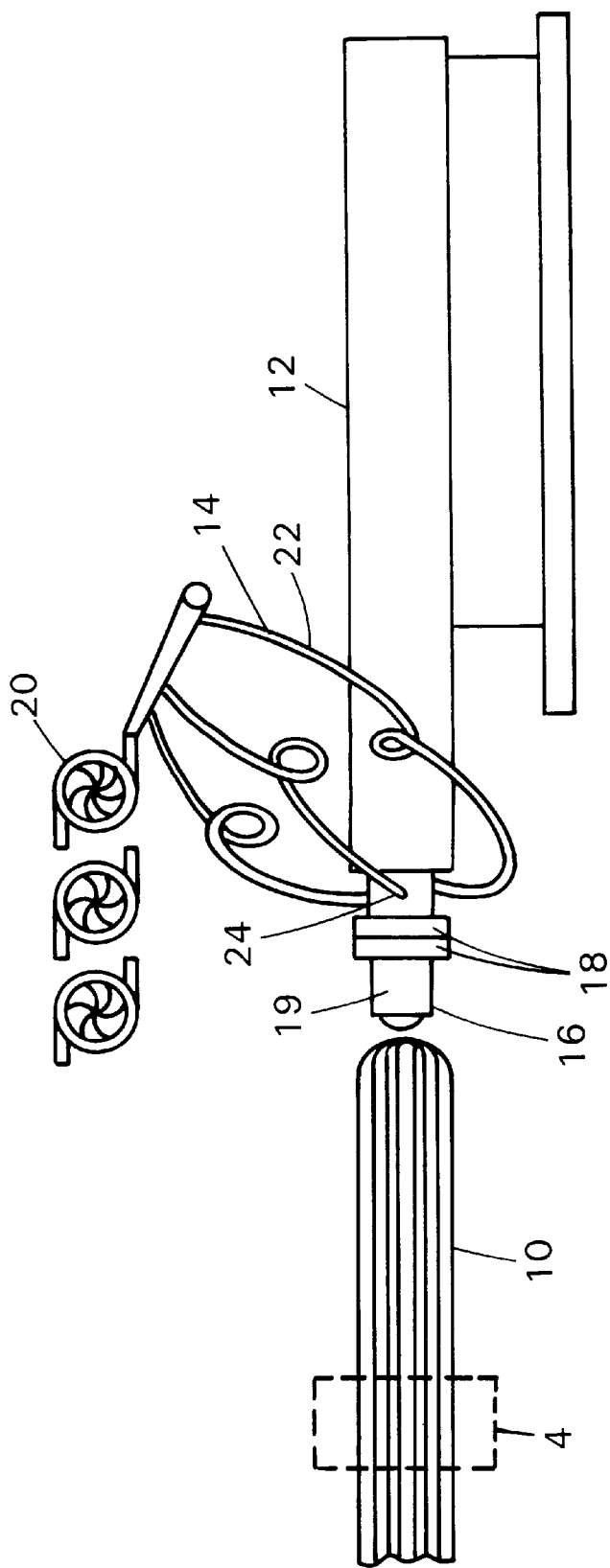
FIG. 1 is a schematic drawing of an extruder configured to extrude variegations articles.

Referring to FIG. 1, the composition being extruded as extruded article 10 is heated to a melt temperature at which the composition can be extruded in extruder 12. Liquid color 14, which is compatible with the melted composition, is added to the melted composition near the end of extruder having die 16 through which the composition is extruded in order to produce elongated variegations on extruded article 10.

Liquid color 14 is pumped into the melted composition having a base color at high pressure, but prior to breaker plate assembly 18. Die 16 is attached to breaker plate assembly 18 by adaptor piece 19. Liquid color 14 has a color that is different from the base color of the melted composition. The pressure for delivering liquid color 14 to the composition is high enough to overcome the pressure within the extruder (i.e., the pressure is higher than the extruder pressure). Liquid color is added to the melted composition by means of pump 20 which is connected through tubes 22 to injection ports 24 located near extrusion die 16. The preferred location of injection ports 24 is approximately 8 to 10 inches before the breaker plate assembly. It is possible to introduce variegations by injection of the liquid color after the breaker plate assembly in certain configurations.

The liquid color is injected after the mixing section of the extruder so that the color is not homogenized with the base color of the melt composition. The flow rate of the liquid color can be adjusted using the pump to modify the variegation pattern of the extruded article. A number of different liquid colors can be added to the melted composition using other injection ports in the extruder.

Figure 2:
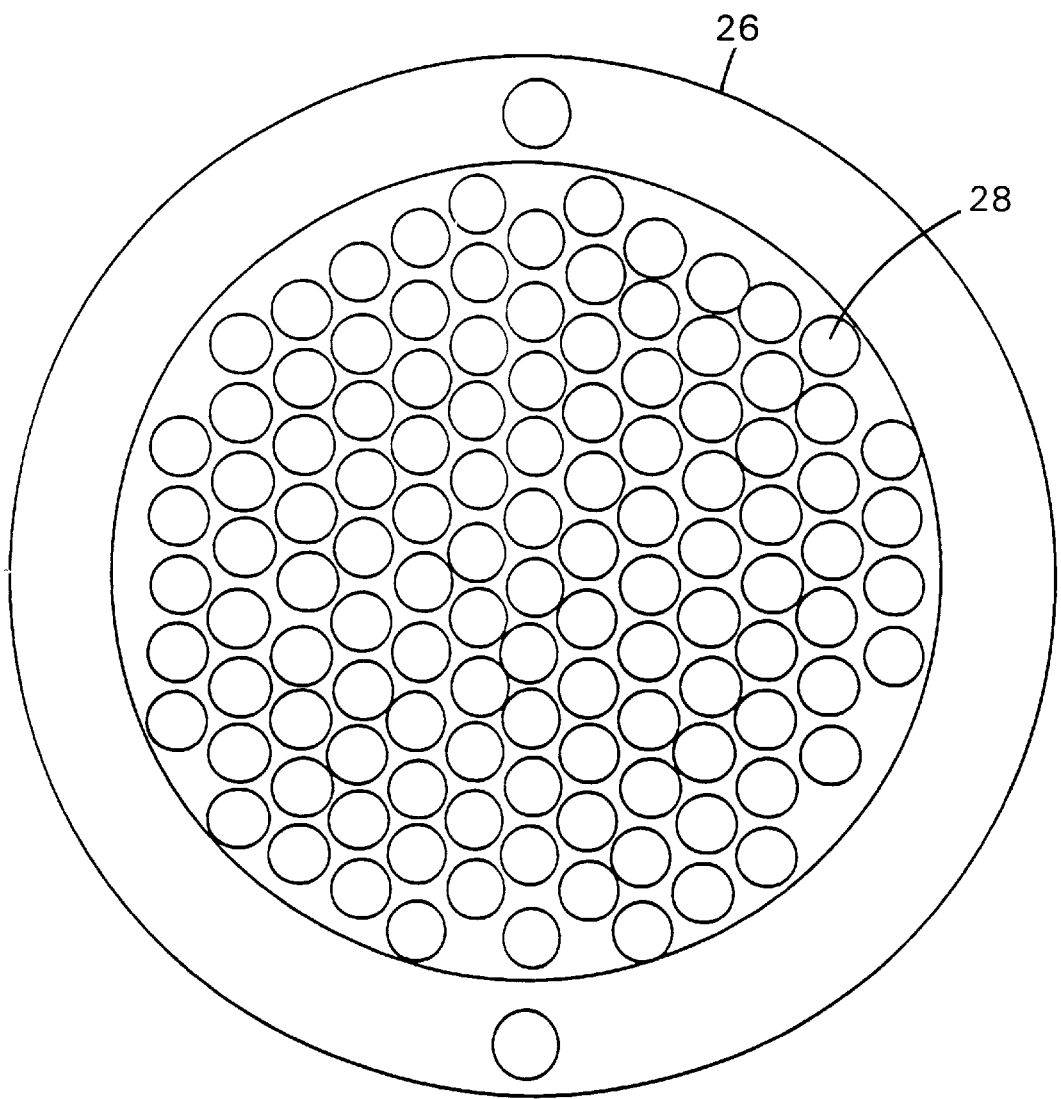
FIG. 2 is an end view of the breaker plate.

Breaker plate assembly 18 includes a hinged gate housing the breaker plate and screen pack. The breaker plate provides support to the screen pack as the composition is extruded. Referring to FIG. 2, breaker plate 26 has a plurality of openings 28 that permit the melted composition to be extruded. Openings 28 are arranged to properly support the screen pack without raising the pressure within the extruder excessively. Openings 28 generally have diameters of between about 0.1 and 0.3 inches.

Figure 3:
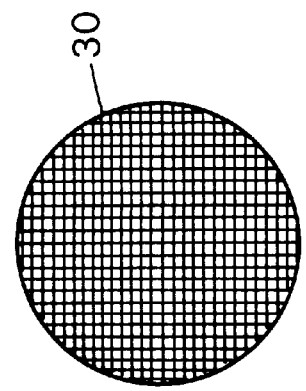
FIG. 3 is an end view of a screen of a screen pack.

Referring to FIG. 3, screen pack 30 is a screen having a mesh size (e.g., between 20 and 80 mesh), or a plurality of screens of varying mesh sizes, that removes particulate debris from the melted composition before exiting the die. The mesh of the screen pack 30 and the openings 28 in the breaker plate 26 divide the regions of the melted composition colored by the liquid color from regions of the unmodified base color of the melted composition as it flows to the die. This interaction produces variegations downstream after passing through breaker plate assembly 18 that elongate during extrusion.

Figure 4:
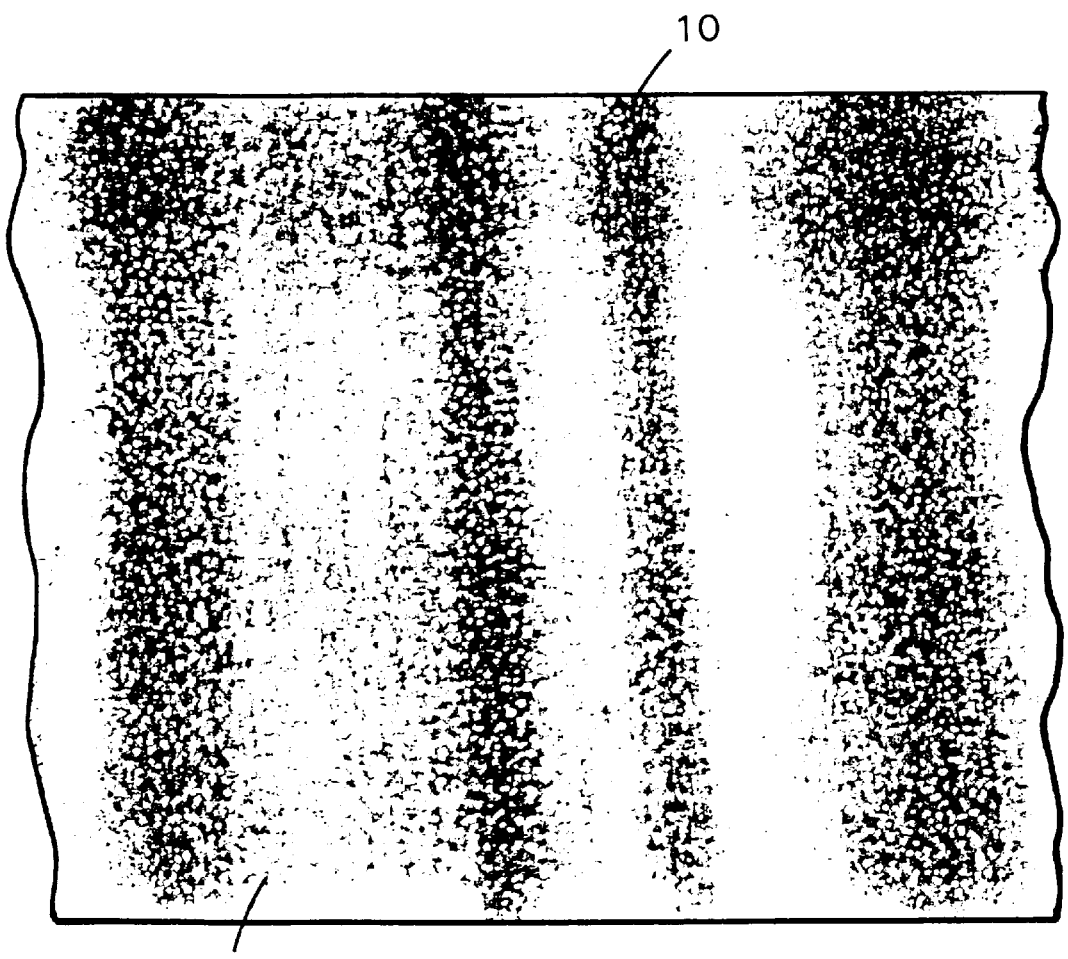
FIG. 4 is an image of the variegated surface of the extruded article in FIG. 1.

The polymer melt with variegations continues to flow through the die and extrudes as an extruded article with elongated variegations. Referring to FIGS. 1 and 4, extruded article 10 has variegations that are elongated parallel to the direction of extrusion. The variegations are generally at the surface of extruded article 10, since the composition does not mix substantially after injection of the liquid color. The pattern of openings in the breaker plate and the screen pack leads to broad stripes 30 and thin stripes which are sometimes discernable, respectively. Accordingly, the pattern of variegations is the article can be altered by changing the pattern and diameter of the openings 28 in breaker plate 26 or the configuration of the screen pack. The openings 28 in breaker plate 26 appear to make a more noticeable difference in the pattern.

The article can be extruded as a solid composition, the foam can be directly produced upon exiting the die by using a physical foaming agent with the stripes readily visible. Alternatively, the foam can be produced with a chemical foaming agent. In this manner the liquid color would become part of the solid extruded article. In a subsequent, and optional step, heating to effect the expansion process the matrix would be converted into foam with stripes.

The foam is generally a closed-cell foam, where greater than approximately 70% of the form cell volumes have cell walls isolating them from the external atmosphere. One way to determine this is by measuring the amount of water that is absorbed into the foam when the foam is immersed in water.

The foam lacks corrugation which are regions of the foam in which the cell walls have ripped during expansion to form wave-shaped channels through the foam. Corrugation is a result of too many cells (or bubbles) forming in the foam at one time. There are too many nucleation sites. Corrugation makes the foam difficult to laminate, decreases the aesthetics of the foam, and leads to variability in the properties of the foam.

The liquid color can be any matrix compatible with the composition being extruded containing a pigment that can be injected into the extruder. The matrix can be an organic solvent or a low melting material (i.e., a wax or polymer) that is heated prior to injection. The pigment can be any organic or inorganic colorant or dye that is compatible with the composition being extruded. A preferred liquid color is commercially available as LIQUID COLOR from Reed Spectrum of Holden, Mass. The amount and pigment of the liquid color used depends on the desired visual effect in the extruded product.

In addition, the extruded articles can be produced with cross-linked or non-cross-linked polyolefinic materials, including but not limited to polyethylene, polypropylene, polystyrene, ethylene-vinyl acetate copolymers, a thermoplastic polyolefin rubber, a thermoplastic elastomer, or a combination thereof.

The foam is a blend of LDPE and at least one silane-grafted single-site initiated polyolefin resin. The preferred level of silane-grafted single-site initiated polyolefin resin, in weight percent of the total polymeric content of the foam, is preferably between about 2 percent and about 30 percent more preferably between about 3 percent and about 18 percent.

The single-site initiated polyolefin resins are derived from ethylene polymerized with at least one comonomer selected from the group consisting of at least one alpha-unsaturated $C_3$–$C_{20}$ olefin comonomers. Preferably, the alpha-unsaturated olefins contain between 3 and 16 carbon atoms, most preferably between 3 and 8 carbon atoms. Examples of such alpha-unsaturated olefin comonomers used as copolymers with ethylene include, but are not limited to, propylene, isobutylene, 1-butene, 1-hexene, 3-methyl-1-pentene, 4-methyl-1-pentene, 1-octene, 1-decene, 1-dodecene, styrene, halo- or alkyl-substituted styrene, tetrafluoroethylene, vinylcyclohexene, and vinylbenzocyclobutane.

The comonomer content of the polyolefin resins is generally between about 1 mole percent and about 32 mole percent, preferably between about 2 mole percent and about 26 mole percent, and most preferably between about 6 mole percent and about 25 mole percent.

The copolymer can include one or more $C_4$–$C_{20}$ polyene monomers. Preferably, the polyene is a straight-chain, branched chain or cyclic hydrocarbon diene, most preferably having between 6 and 15 carbon atoms. It is also preferred that the diene be non-conjugated. Examples of such dienes include, but are not limited to, 1,3-butadiene, 1,4-hexadiene, 1,6-octadiene, 5-methyl-1,4-hexadiene, 3,7-dimethyl-1,6-octadiene, 3,7-dimethyl-1,7-octadiene, 5-ethylidene-2-norbornene, and dicyclopentadiene. Especially preferred is 1,4-hexadiene.

The preferred single-site initiated polyolefin resins include either ethylene/alpha-unsaturated olefin copolymers or ethylene/alpha-unsaturated olefin/diene terpolymers.

Preferred single-site initiated polyolefin resins are described, for example, in S.-Y. Lai, et al., U.S. Pat. Nos. 5,272,236, 5,278,272, and 5,380,810, in L. Spenadel, et al., U.S. Pat. No. 5,246,783, in C. R. Davey, et al., U.S. Pat. No. 5,322,728, in W. J. Hodgson, Jr., U.S. Pat. No. 5,206,075, and in F. C. Stehling, et al., WO 90/03414, each of which is incorporated herein by reference. The resins contain varying amounts of short-chain and long-chain branching, which depend, in part, on the processing conditions. Some single-site initiated polyolefin resins are available commercially from Exxon Chemical Company, Houston, Tex. from Dow Plastics, Midland, Mich. (or DuPont/Dow).

LDPE resins are described, for example, in "Petrothene® Polyolefins . . . A Processing Guide," Fifth Edition, Quantum USI Division, 1986, pages 6–16, incorporated herein by reference. Some LDPE resins are commercially available from Exxon Chemical Company, Houston, Tex., Dow Plastics, Midland, Mich., Novacor Chemicals (Canada) Limited, Mississauga, Ontario, Canada, Mobil Polymers, Norwalk, Conn., Rexene Products Company, Dallas, Tex., Quantum Chemical Company, Cincinnati, Ohio, and Westlake Polymers Corporation, Houston, Tex. Commercially available LDPE resins include Eastman 1924P, Eastman 1550F, Eastman 800A, Exxon LD 117.08, Exxon LD 113.09, Dow 535I, Dow 683, Dow 760C, Dow 768I, Dow 537I, Novacor LF219A, Novacor LC05173, Novacor LC0522A, Mobil LMA-003, Mobil LFA-003, Rexene 2018 (7018), Rexene 1023, Rexene XO 875, Rexene PE5050, Rexene PE1076, Rexene PE2030, Quantum NA953, Quantum NA951, Quantum NA285-003, Quantum NA271-009, Quantum NA324, Westlake EF606AA, Westlake EF612, and Westlake EF412AA.

The densities, or specific gravities, of the polymer resins can be measured using ASTM D-792 methods.

Silane-grafting of the polyolefin resin or resin blend occurs when the polymer backbone is activated and reacts with a silane reagent to form the graft copolymer. The silane-graft can include a subsequently cross-linkable moiety in the graft chain. For example, the cross-linking can occur under warm, moist conditions when the cross-linkable moiety is hydrolyzable, optionally in the presence of a suitable catalyst. Levels of cross-linking can be adjusted by varying the amount of silane-grafting introduced to the polyolefin resin or the polyolefin resin/LDPE blend. The silane-grafting occur in a separate process, or during a continuous blending and extruding process. Silane-grafting is generally accomplished by adding azido- or vinyl-functional silanes and a graft initiator to the polyolefin resin or blend. The grafting of the polyolefin resin or blend can take place, for example, in an extruder.

The silane-grafting process is described, for example, in U.S. Ser. No. 08/638,122, filed Apr. 26, 1996 and entitled "Cross-Linked Low-Density Polymer Foam", now U.S. Pat. No. 5,844,009, and U.S. Ser. No. 08/308,801, filed Sep. 19, 1994 and entitled "Cross-Linked Foam Structures of Essentially Linear Polyolefins and Process for Manufacture," now abandoned, both of which are incorporated herein by reference.

Suitable vinyl-functional silanes include vinyl-functional alkoxy silanes such a vinyl trimethoxy silane (VTMOS) and vinyl triethoxy silane (VTEOS). Generally during grafting, graft initiators such as the peroxides are included with the vinyl-functional silane to perform a hydrogen abstraction from the polyolefin resin backbone to initiate grafting and polymerization of the vinyl-functional silane.

The graft initiator can be a free radical generating species, for example, a peroxide. Examples of peroxides include dicumylperoxide, 2,5-dimethyl-2,5-di(t-butylperoxy) hexane, 1,1-bis(t-butylperoxy)-3,3,5-trimethylcyclohexane, 1,1-di-(t-butylperoxy)cyclohexane, 2,2'-bis(t-butylperoxy) diisopropylbenzene, 4,4'-bis(t-butylperoxy)butylvalerate, t-butylperbenzoate, t-butylperterephthalate, and t-butyl peroxide. Most preferably, the graft initiator is dicumylperoxide or 2,2'-bis(t-butylperoxy)diisopropylbenzene.

The graft can include other monomers, such as di- and tri-allyl cyanurates and isocyanurates, alkyl di- and tri-acrylates and methacrylates, zinc dimethacrylates and diacrylates, styrenes, and butadiene.

The grafted polymer resin can be cross-linked by exposure to moisture to effect silanol condensation reactions of the hydrolyzable groups of the pendant silane-grafts. Cross-linking develops through hydrolysis of the silane groups to form silanols which condense to form siloxanes. The condensation of silanols to siloxanes is catalyzed by metal carboxylates such as, for example, dibutyl tin dilaurate or dibutyl tin maleate. The metal carboxylates can be added to the polymer resin mixture before grafting, before blending, before extrusion, or before exiting the die. The metal carboxylates are generally added in a liquid form or compounded in a polymer resin.

Most preferably, the silane is VTMOS, that is grafted on to the polymer backbone by a reaction which is initiated by 2,2'-bis(t-butylperoxy)diisopropylbenzene. The most preferred silanol condensation catalyst is dibutyl tin dilaurate. The cross-linking can be induced by the presence of atmospheric moisture, steam, or hot water. Cross-linking can take place predominantly (e.g., more than 50% of the potential cross-linking) prior to expansion (or extrusion) of the foam. Alternatively, the cross-linking can take place predominantly after expansion of the foam.

Regardless of the method of cross-linking used, acceptable foam articles can only be obtained in certain ranges of cross-linking density or level, which is related to the amount of silane-grafting in the blend. Too much cross-linking prior to foaming can render the foam inelastic, resulting in less than optimal expansion and greater than optimal density for a given level of foaming agent. Too little cross-linking can be detrimental to physical properties such as compression set properties or thermal resistance, for example. It is important to choose cross-linking levels that afford foams with particular desired properties. The silane-grafting and resulting crosslinks increase the melt strength of the composition. The cross-linking levels can be determined by establishing the gel content of the of the composition, for example, by extraction with a solvent such as xylenes.

The expanding medium, or foaming agents, useful in the practice of the present invention can be physical foaming agents. The term "physical foaming agent," as used herein, means a medium expanding composition that is a gas at temperatures and pressures encountered during the foaming step. Typically, a physical foaming agent is introduced to the polymer blend in the gaseous or liquid state and expands, for example, upon a rapid decrease in pressure.

Physical foaming agents include low molecular weight organic compounds including $C_1$–$C_6$ hydrocarbons such as acetylene, propane, propene, butane, butene, butadiene, isobutane, isobutylene, cyclobutane, cyclopropane, ethane, methane, ethene, pentane, pentene, cyclopentane, pentene, pentadiene, hexane, cyclohexane, hexene, and hexadiene, $C_1$–$C_5$ organohalogens, $C_1$–$C_6$ alcohols, $C_1$–$C_6$ ethers, $C_1$–$C_5$ esters, $C_1$–$C_5$ amines, ammonia, nitrogen, carbon dioxide, neon, or helium. The preferred foaming agents include butane, isobutane, carbon dioxide, and 1,1-difluoroethane (HFC-152a). The preferred physical foaming agent concentration prior to expanding the foam is between 0.5 and 20 percent.

The foam can take virtually any physical configuration, preferably the form of a sheet, plank, or other regular or irregular extruded profile. A foam sheets are extruded from circular dies and have thicknesses between about 1/32 inch and 3/4 inch and widths up to 82 inches. Generally, the polyethylene foams are configured as planks, extruded from flat dies, with plank thicknesses between about 1 inch and 4.5 inches and widths between about 24 inches and 48 inches. The foam planks can be laminated by direct application of heat to the interface between two or more planks.

In preferred embodiments, it is not necessary to add an adhesive to the interface to laminate the planks.

Two additional additives in the foam composition can dramatically effect the properties of the foam. These include gas exchange additives and cell nucleating agents, such as zinc stearate and talc, respectively. The preferred gas exchange additive concentration in the foam is between 0.5 and 2.0 percent. The preferred cell nucleating agent concentration in the foam is between 0.05 and 2.0 percent.

Other additives, alone or in combination, can be added to the foam compositions, including particulate and fibrous fillers to reinforce, strengthen or modify the rheological properties of the foam composition, antioxidants (e.g., hindered phenolics such as Irganox 1010, phosphites such as Irgafos 168, or polymerized trimethyl-dihydroquinoline such as Agerite AK, Resin D or Flectol H), ultra-violet stabilizers, thermal stabilizers, antistatic components, flame retardants, pigments or colorants, and other processing aids.

Methods of combining the various ingredients of the foamable composition include, for example, melt-blending, diffusion-limited imbibition, or liquid mixing. Any or all of the ingredients can be pulverized or reduced in particle-size by other methods prior to use. Melt-blending can be accomplished in a batchwise process or a continuous process. It is preferred that the blending be carried out with temperature control. Many suitable devices for melt-blending are known to the art, including, for example, mixers with single and multiple Archimedean-screw conveying barrels, high-shear "Banbury" type mixers, and other internal mixers. The object of such blending (or mixing) is to provide a uniform mixture. Components can be introduced to the mixture sequentially at any step during the mixing operation. The mixture includes a physical foaming agent that expands, for example, upon exposure to the sudden release of pressure.

One preferred method of providing a sheet object of this invention involves blending the silane-grafted single-site initiated polyolefin resin with LDPE, extruding and expanding the blend to afford a foam, and cross-linking the foam with moisture. The silane-grafted single-site initiated polyolefin resin can be prepared in a separate process or an independent step.

For example, the single-site initiated polyolefin resin is melt-blended with a 20:1 mixture of vinyl trimethoxy silane (VTMOS) and dicumylperoxide in an extruder to effect the grafting of VTMOS onto the resin. This composition is extruded out of a multiple-strand die face and is then pelletized. The resulting silane-grafted single-site initiated polyolefin resin is melt-blended with ungrafted LDPE resin and other additives, such as gas exchange additives (e.g., zinc stearate), pigments, cell nucleating agents (e.g., talc), cross-linking catalysts (e.g., dibutyl tin dilaurate), or, optionally, antioxidants and stabilizers. The mixture is combined with the physical foaming agent (e.g., isobutane). The blending can occur in a single-screw extruder or a twin-screw extruder. The composition is extruded out of, for example, a coat-hanger die and the foaming agent expands resulting in a fully-expanded foam sheet or plank. The foaming step can be carried out during extrusion or in a subsequent step. The sheet, plank, or board is then placed in humid storage for aging, during which time the foam cross-links due to exposure to moisture and the expanded gas in the foam cells exchanges with air.

Alternatively, the single-site initiated polyolefin resin and the LDPE resin can be blended and silane-grafted in a single step. optionally, the blend containing silane-grafted material can be extensively cross-linked prior to foaming.

The following specific examples are to be construed as merely illustrative, and not limitive, of the remainder of the disclosure.

EXAMPLE

A 4.5 inch diameter, 44:1 single screw extruder was used to convey, melt, and ultimately produce physically blown polyethylene foam. The low density polyethylene resin used was silane-grafted (0.4 percent) to aid in processing and in final material physical properties. Following silane-grafting, the grafted resin was extruded with the single screw extruder equipped with injection ports, an adapter piece, and a circular die. One injection port was used to inject butane into the melted composition as the physical foaming component. The die was attached to the extruder with the adapter piece which was constructed to hold the breaker plate in the extruder. The breaker plate had multiple 0.250" holes drilled through it to permit flow of molten composition through it. One purpose of the breaker plate is to hold various combinations of metal screens. These screens (i.e., screen packs) are designed to remove foreign material from the molten composition as the material passes from the end of the extruder, through the screen pack and into the die, protecting the die from being fouled with debris. The breaker plate had 242 openings, each having a diameter of approximately 0.204 inches. The screen pack was a 20 mesh screen/40 mesh screen/60 mesh screen/20 mesh screen configuration. Between the end of the screw of the extruder and the screen pack/breaker plate assembly, a second injection port was made available for the injection of liquid color. Using this port, Reed Spectrum Liquid Color was injected under pressure into the melted composition. The pumping force used was sufficient to overcome the approximate 1200 psi pressure of the melted composition. The temperature of the melted polymer was approximately 300° F. where the liquid color is injected. As the liquid color is injected, it flows through the various holes in the breaker plate/screen pack assembly without being thoroughly mixed and homogeneously dispersed through the melted composition. The breaker plate holes with the screen pack essentially divided the injected polymer containing the liquid color into many streams. These streams of color remained on the surface of the material the rest of the way through the adapter and through the die to emerge on the surface of the foam extrudate due in part to the viscosity of the melt.

Other embodiments are within the claims.

What is claimed is:

1. A method of extruding a variegated article comprising the steps of:
   heating a composition having a base color to a melt temperature in an extruder, the extruder including an extruder die, a mixing section, a plurality of openings located after the mixing section, and an injection port located near the extruder die and the plurality of openings and after the mixing section of the extruder;
   adding a liquid color including a second color different from the base color to the heated composition through
   passing the variegated mixture through the plurality of openings within the extruder; and
   extruding the variegated mixture from the die to give a variegated article.

2. The method of claim 1, wherein at least some of the extruder openings are openings in a breaker plate.

3. The method of claim 2, wherein at least some of the extruder openings are openings in a screen.

4. The method of claim 1, wherein the liquid color is fluid at temperatures less than the melt temperature.

5. The method of claim 1, wherein the composition includes a polyolefin resin.

6. The method of claim 5, wherein the polyolefin resin is silane-grafted.

7. The method of claim 5, wherein the polyolefin resin is a single-site initiated polyolefin resin.

8. The method of claim 1, further comprising the step of foaming the variegated article after extrusion to give a variegated foam article.

9. The method of claim 1, wherein the composition includes a physical foaming agent.

10. An extruded article comprising a uniform composition having a base color and a plurality of elongated variegations of a second color different from the base color, the elongated variegations being parallel to the direction of extrusion of the extruded article and substantially at a surface of the extruded article, wherein the composition includes a foaming agent.

11. The extruded article of claim 10, wherein the composition includes a polyolefin resin.

12. The extruded article of claim 11, wherein the polyolefin resin is silane-grafted.

13. The extruded article of claim 11, wherein the polyolefin resin is a single-site initiated polyolefin resin.

14. The extruded article of claim 10, wherein the variegated article is foamed.

15. A method of extruding a variegated article comprising the steps of:
    heating a composition having a base color to a melt temperature in an extruder, the extruder including an extruder die, a mixing section, a plurality of openings located near the mixing section, and an injection port located near the extruder die and after the plurality of openings and the mixing sections of the extruder;
    passing the heated composition through the plurality of openings within the extruder;
    adding a liquid color including a second color different from the base color to the heated composition through the injection port to form a variegated mixture, wherein the variegated mixture to be extruded includes a foaming agent; and
    extruding the variegated mixture from the die to give a variegated article.

16. The method of claim 15, wherein at least some of the extruder openings are openings in a breaker plate.

17. The method of claim 15, wherein at least some of the openings are openings in a screen.

18. The method of claim 15, wherein the composition includes a polyolefin resin.

19. The method of claim 18, wherein the polyolefin resin is silane-grafted.

20. The method of claim 18, wherein the polyolefin resin is a single-site initiated polyolefin resin.

21. The method of claim 15, further comprising the step of foaming the variegated article after extrusion to give a variegated foam article.

* * * * *